United States Patent [19]
Mandel et al.

[11] Patent Number: 5,422,580
[45] Date of Patent: Jun. 6, 1995

[54] SWITCHABLE ACTIVE TERMINATION FOR SCSI PERIPHERAL DEVICES

[75] Inventors: Paul G. Mandel, Kansas City, Mo.; Richard A. Ralston, Jr., Shawnee Mission, Kans.; Gary E. Robertson, North Kansas City, Mo.

[73] Assignee: APS Technologies, Kansas City, Mo.

[21] Appl. No.: 135,967

[22] Filed: Oct. 14, 1993

[51] Int. Cl.⁶ .............................. H03K 17/16
[52] U.S. Cl. ........................ 326/30; 326/86; 326/90; 375/257
[58] Field of Search .............. 307/475, 443, 296.6, 307/147; 375/36; 340/825.5; 333/34 R; 326/30, 86, 90

[56] References Cited

U.S. PATENT DOCUMENTS

| | | | |
|---|---|---|---|
| 4,200,876 | 8/1980 | Ray | 307/296.6 |
| 4,675,551 | 6/1987 | Stevenson et al. | 307/443 |
| 4,748,426 | 5/1988 | Stewart | 307/443 |
| 4,821,170 | 4/1989 | Bernick et al. | 364/200 |
| 4,831,283 | 4/1989 | Newton | 307/443 |
| 4,859,877 | 8/1989 | Cooperman et al. | 307/443 |
| 4,864,291 | 9/1989 | Korpi | 340/825.5 |
| 4,920,339 | 4/1990 | Friend et al. | 340/825.52 |
| 5,029,284 | 7/1991 | Feldbaumer et al. | 307/443 |
| 5,272,396 | 12/1993 | Mammano et al. | 307/443 |

OTHER PUBLICATIONS

Product & Applications Handbook 1993-1994, by Unitrode Integrated Circuits Corporation (U.I.C.C.), Jun. 1993.
Unitrode, SCSI Active Terminator, UC5601, data manual, Sep. 9, 1991.

Primary Examiner—Edward P. Westin
Assistant Examiner—Richard Roseen
Attorney, Agent, or Firm—Michael A. O'Neil

[57] ABSTRACT

A switchable active termination device internally mounted within a peripheral device and electrically connected to the end of a Small Computer Systems Interface (SCSI) bus cable. Through use of a pair of SCSI active terminator circuit chips, the termination device actively terminates the data lines of the bus cable in a first operating mode in response to a first digital command by providing precise resistive pull-up to a predetermined value on each data line. In a second mode of operation responsive to a second digital command, the termination device disconnects all terminating resistors. Activation of the termination modes is logically driven from an included switch, with visual indication of the presence of an active termination state provided by a light emitting diode.

17 Claims, 1 Drawing Sheet

SWITCHABLE ACTIVE TERMINATION FOR SCSI PERIPHERAL DEVICES

TECHNICAL FIELD

The present invention relates to line termination devices and, in particular, to a switchable active termination device for connection to the end of a Small Computer Systems Interface (SCSI) bus cable.

SUMMARY OF THE INVENTION

There is a known need for some sort of termination at the ends of Small Computer Systems Interface (SCSI) bus cables that are coupled to peripheral devices. The present invention comprises a switchable active termination device utilizing a pair of commercially produced SCSI active terminator circuit chips installed within a peripheral device and connected in parallel to the SCSI bus cable which is connected to the host peripheral device. Power for the active terminator circuit chips is provided through one line of the bus cable or from the peripheral device power supply. Activation of the termination function that is provided by the included terminator circuit chips is logically driven from a user activated switch, with visual indication of the presence of an active termination state provided by a light emitting diode.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
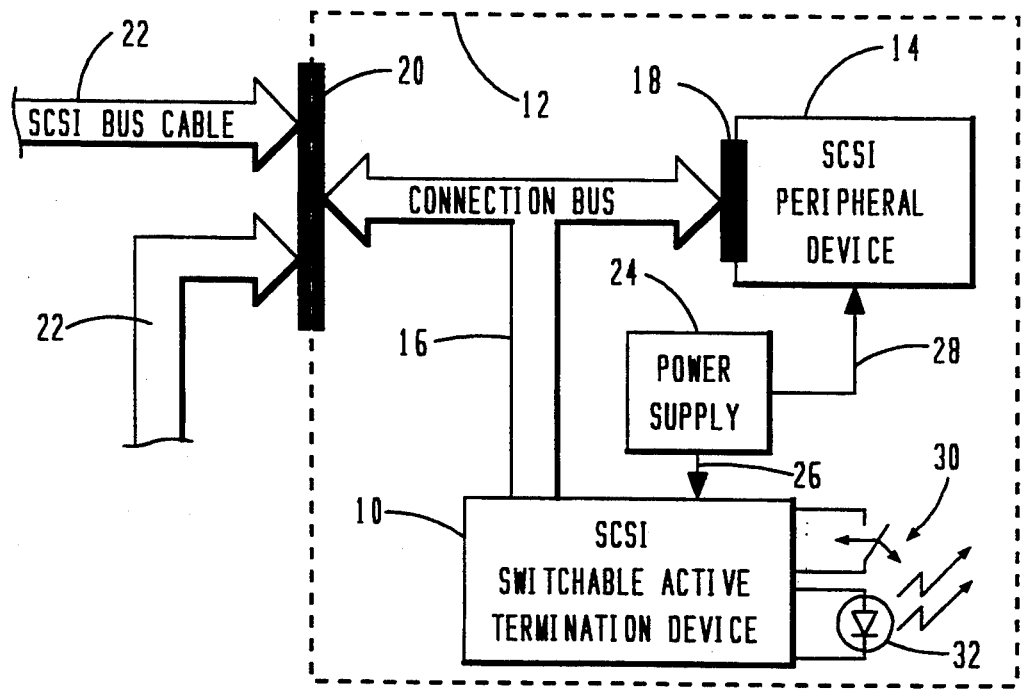
FIG. 1 illustrates the installation of the switchable active termination device of the present invention within a peripheral device and connected to an SCSI bus cable.

Referring now to FIG. 1, there is illustrated the installation of a switchable active termination device 10 according to the present invention within the housing 12 for a conventional SCSI peripheral device 14 such as a peripheral storage device or the like. Unlike known prior art termination devices, the termination device 10 of the present invention is internally mounted within the housing 12 of the peripheral device 14 thus facilitating space savings, ease of operation and bus cable connection. The termination device 10 includes a connector bus 16 for connecting at least one header 18 to the peripheral device 14 and at least one header 20 for connecting to at least one conventional SCSI bus cable 22. The header 20 allows for the connection to two SCSI bus cables (as shown) to accommodate computer system designs wherein the peripheral device 14 is not located at the distal end of a bus cable.

The termination device 10 is powered from the power supply 24 provided within the housing 12 for the peripheral device 14, and is also powered, as will be discussed in more detail below, from the power line included in the SCSI bus cable 22 (and connector bus 16). Power from supply 24 is transmitted to the termination device 10 along line 26 and to the peripheral device 14 along line 28. The termination device 10 further includes a switch 30 for controlling device operation having an unactuated position (shown) and an actuated position (not shown). A light emitting diode 32 is also included and is responsive to the activation of the switch 30 to provide a visual indication to the user of the present active termination state for the termination device 10.

Figure 2:
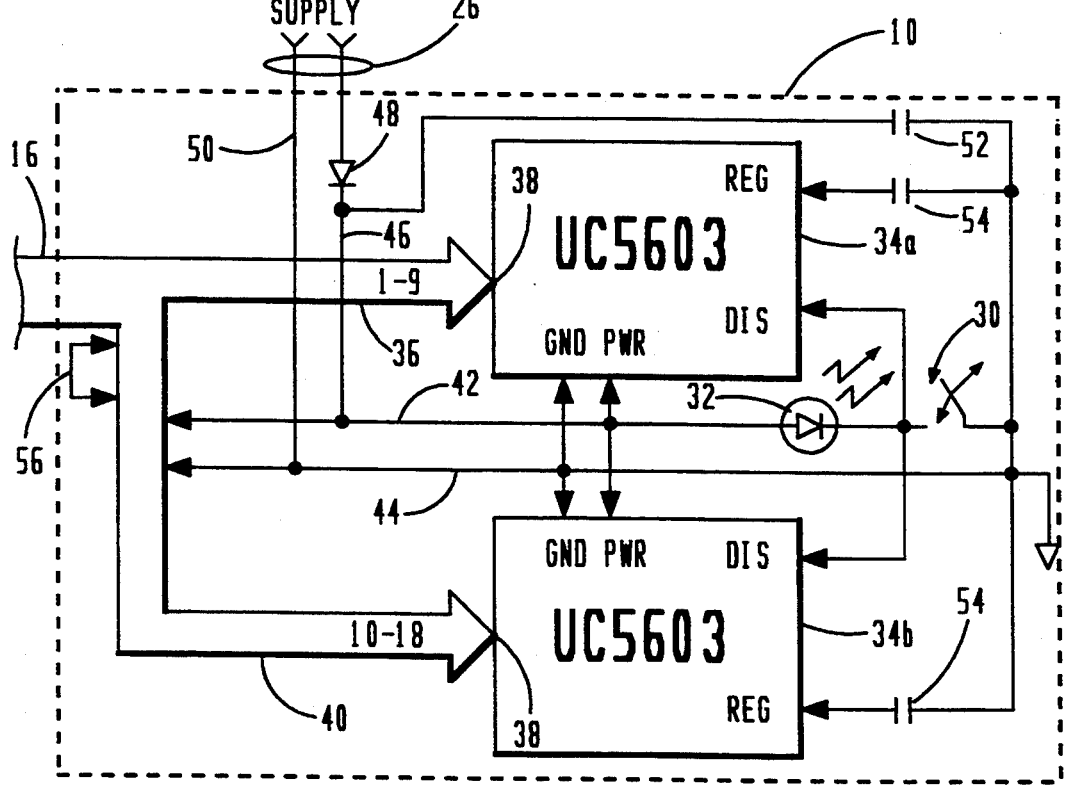
FIG. 2 shows a schematic circuit diagram of the switchable active termination device of the present invention.

Reference is now made to FIG. 2 wherein there is shown a schematic circuit diagram of the switchable active termination device 10 of the present invention comprising two SCSI active terminator circuit chips 34a and 34b connected in parallel to the connector bus 16. Circuit chips 34a and 34b preferably each comprise a UC5603 9-line SCSI Active Terminator chip manufactured by Unitrode Integrated Circuits. A single UC5601 18-line SCSI Active Terminator Chip (Unitrode) may be substituted for the foregoing two UC5603 chips if desired. SCSI data lines one through nine, see reference 36, of the SCSI bus cable 22 (and connector bus 16) are connected to the termination interface port 38 of the first circuit chip 34a. Similarly, SCSI data lines ten through eighteen, see reference 40, of the SCSI bus cable 22 (and connector bus 16) are connected to the termination interface port 38 of the second circuit chip 34b.

The termination power supply line 42 of the SCSI bus cable 22 (and connector bus 16) is connected to the power input (PWR) of both circuit chips 34a and 34b. Similarly, the ground line 44 of the SCSI bus cable 22 (and connector 16) is connected to the ground input (GND) of both circuit chips 34a and 34b. As discussed above, the termination circuit 10 also receives power from the power supply 24 for the peripheral device 14 along line 26 comprised of a power line 46 (including a flow diode 48) connected to the supply line 42 and a ground line 50 connected to the ground line 44. A capacitor 52 connected between the power line 46 and ground line 44 filters transients present in the power supplied to the termination device 10 from the power supply 24 for the peripheral device 14. The power supply line 42 is further connected through LED 32 to the disconnect ports (DIS) of both circuit chips 34a and 34b, with a connection further made from the disconnect ports to the ground line 44 through actuation switch 30. The termination device further includes a pair of capacitors 54 connected from the regulator output port (REG) of each circuit chip 34a and 34b to the ground line 44.

When the switch 30 is placed in the unactuated position (as shown), the disconnect ports (DIS) are applied with power (logic high) from supply line 42 and the circuit chips 34a and 34b respond by providing a precision resistive pull-up to a predetermined reference voltage on all data lines one through eighteen, see references 36 and 40, of the bus cable 22. When the switch 30 is placed in the actuated position (not shown), the disconnect ports (DIS) of circuit chips 34a and 34b are grounded (logic low), and current flows through and illuminates LED 32. In response to the grounding of the disconnect ports (DIS), the terminating resistors within the circuit chips 34a and 34b connected to the data lines one through eighteen, see references 36 and 40, of the SCSI bus cable 22 (and connector bus 16) are disconnected.

The terminating resistors selectively connected to each data line of the SCSI bus cable 22 (and connector bus 16) provide a matched impedance to the impedance of the bus cable 22. Such impedance matching allows for fewer SCSI retries and increased bus speed (bandwidth) for data communication to and from the peripheral device 14. Furthermore, the present termination device facilitates a line frequency response time that substantially exceeds the performance of prior art external termination devices, while reducing pulse fluctuations and noise on the data lines (36 and 40) of the bus cable 22. The termination device 10 further includes a jumper (as generally indicated at 56) for providing an electrical connection between pin forty (-RST) of standard SCSI header 20 at the SCSI bus cable 22 and pin forty (-RST) of standard SCSI header 18 at the peripheral device 14. The jumper 56 enables a reset operation to be performed on the SCSI peripheral device, and is especially useful when the peripheral device is a storage device such as a disk drive.

Although a preferred embodiment of the switchable active termination device of the present invention has been illustrated in the accompanying Drawings and described in the foregoing Detailed Description, it will be understood that the invention is not limited to the embodiment disclosed, but may be modified without departing from the spirit of the invention as set forth and defined by the following claims.

We claim:

1. A SCSI termination device, comprising:
   a first bus connector for connecting the termination device with a first SCSI bus cable;
   a second bus connector for connecting the termination device to a SCSI peripheral device;
   a third bus connector for connecting the termination device with a second SCSI bus cable;
   circuit means connected via a connection bus to the first, second and third bus connectors for selectively providing termination of the SCSI bus cables connected to the first and third bus connectors; and
   switch means for selecting activation of the circuit means to terminate the SCSI bus cables.

2. The SCSI termination device as in claim 1 wherein the SCSI bus cable further includes a power supply line and a ground line, the circuit means including means for connecting to the power supply and ground lines.

3. The SCSI termination device as in claim 1 wherein the peripheral device comprises a storage device.

4. The SCSI termination device as in claim 1 further including a light emitting diode responsive to the switch means for providing an indication of the activation of the circuit means.

5. The SCSI termination device as in claim 1 wherein the circuit means comprises a pair of active terminator circuit chips.

6. The SCSI termination device as in claim 5 wherein the active terminator circuit chips comprise UC5603 chips.

7. The SCSI termination device as in claim 1 further including: means for connecting the circuit means to a power supply provided for operation of the SCSI peripheral device.

8. The SCSI termination device as in claim 7 wherein the termination device is installed within the SCSI peripheral device.

9. The SCSI termination device as in claim 7 further including means for filtering transients from the power supplied from the power supply provided for operation of the SCSI peripheral device.

10. The SCSI termination device as in claim 1 wherein the SCSI peripheral storage device, the termination device further including jumper means associated with the connection bus for enabling reset of the peripheral storage device.

11. The SCSI termination device as in claim 10 wherein the peripheral storage device comprises a disk drive and the jumper means facilitates a disk drive reset operation.

12. A SCSI termination device, comprising:
    a first bus connector for connecting the termination device with a SCSI bus cable terminating at a SCSI peripheral storage device;
    circuit means connected via a connection bus to the first bus connector for selectively providing termination of the SCSI bus cable;
    switch means for selecting activation of the circuit means to terminate the SCSI bus cable; and
    jumper means associated with the connection bus for enabling a reset of the peripheral storage device.

13. The SCSI termination device as in claim 12 wherein the peripheral storage device comprises a disk drive and the jumper means facilitates a disk drive reset operation.

14. The SCSI termination device as in claim 12 further including a light emitting diode responsive to the switch means for providing an indication of the activation of the circuit means and the termination of the SCSI bus cable.

15. A SCSI termination device, comprising:
    a first connector for connecting to a SCSI cable;
    a second connector for connecting to a SCSI peripheral device;
    a bus connecting the first connector to the second connector;
    circuit means connected to the bus for selectively providing termination of the SCSI cable connected to the first connector;
    means coupled to the circuit means for selecting activation of the circuit means; and
    a jumper between the first and second connectors for enabling a reset of the SCSI peripheral device.

16. The SCSI termination device as in claim 15 wherein the peripheral device comprises a disk drive and the jumper facilitates a disk drive reset operation.

17. The SCSI termination device as in claim 15 further including a light emitting diode for providing an indication of the termination of the SCSI bus cable.

* * * * *